Patented Sept. 29, 1936

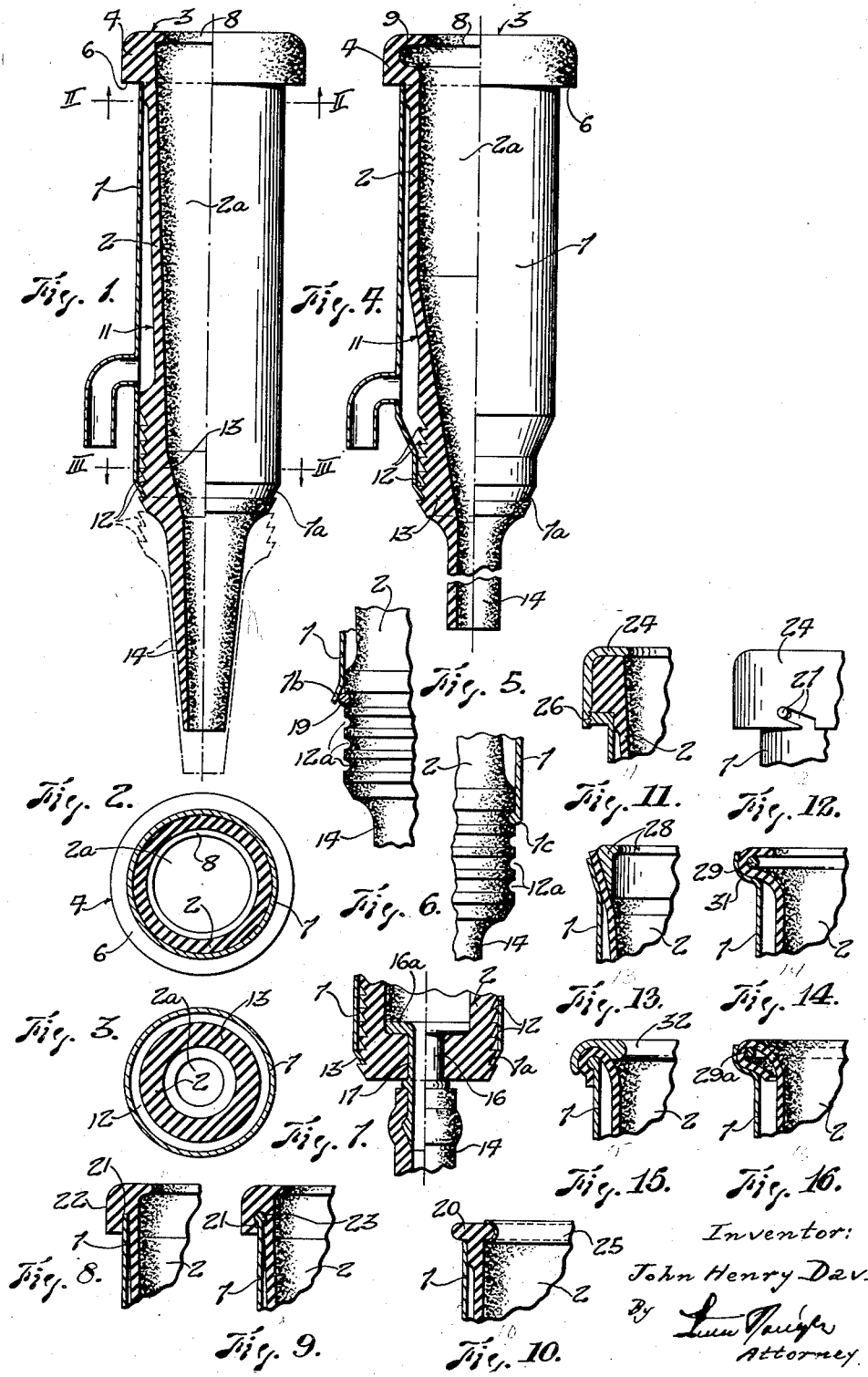

2,055,718

UNITED STATES PATENT OFFICE 2,055,718

TEAT CUP FOR MILKING MACHINES

John Henry Davis, Melbourne, Australia

Application February 28, 1933, Serial No. 658,994
In Australia March 8, 1932

5 Claims. (Cl. 31—85)

This invention relates to milking machine teat cups of the type which include an open ended casing of metal or like material and a lining or inflation of rubber or the like located within said casing and adapted to be influenced by suction produced in the casing in the usual manner. More particularly the invention refers to teat cup inflations which are provided at one end with a plurality of abutments adapted to engage the adjacent end portion of the teat cup casing so that any slackness that may develop in the inflation may be taken up by securing the inflation to the casing at that end remote from said abutments and then stretching the inflation longitudinally until one of the abutments engages the adjacent end of the casing and holds the inflation in a stretched condition.

Hitherto such an abutment has been formed on the claw tube associated with the inflation, the adjacent end of the teat cup casing being provided with an end closure having a central aperture to pass the claw tube and cooperate with the abutment thereon. This construction limits the stretching of the inflation and interferes with cleansing operations in that it is necessary to detach the teat cup from the milking machine claw, for example, before the inflation can be withdrawn through the top of the casing.

The primary object of the present invention is to provide an improved teat cup of the kind indicated which has been designed to simplify and cheapen the manufacture thereof and ensure that the side walls of the inflation will be uniformly stretched when in an operative position within the aforesaid casing while a highly efficient air tight joint is effected between one of the plurality of abutments on the inflation and the adjacent end of the teat cup casing.

Another object of the invention is to provide in a teat cup of the kind indicated an improved mouth piece which eliminates the use of separate locking rings, wedges and like fittings for securing this end of the inflation to the casing.

According to one suitable embodiment, the invention is characterized by the combination with an open ended casing of an inflation of rubber or the like which is provided at its upper end portion with a thickened annular flange forming a mouth piece and adapted to seat firmly against the adjacent end of the casing, a plurality of circumferential abutments being provided on the inflation body at the opposite end thereof for engaging the adjacent end of the casing and holding the inflation in position after it has been stretched as aforesaid.

Various other objects and features of the invention will be more readily apparent from the following description.

Referring to the drawing which forms part of this specification:—

Figure 1 is a part sectional side elevation of a teat cup in accordance with one embodiment of the present invention.

Figures 2 and 3 are cross sections taken on the lines II—II and III—III respectively of Figure 1.

Figure 4 is a part sectional side elevation of a teat cup in accordance with a modification.

Figures 5 and 6 are fragmentary side elevations showing the lower end portions of inflations in accordance with further modifications of the invention.

Figure 7 is a part sectional side elevation of the lower end portion of a teat cup showing a separately formed claw tube connected to the improved inflation in accordance with the invention.

Figures 8 to 16 inclusive are fragmentary details showing various known forms of teat cup mouth pieces which may be employed in combination with an inflation having an abutment at its opposite end in accordance with the invention.

According to one embodiment of the invention as illustrated in Figures 1 to 3 of the accompanying drawing the inflation 2 is provided at its upper end with a mouth piece 3 which is formed integral with the inflation and includes a thickened overhanging annular flange 4 forming a shoulder 6 adapted to seat firmly against the adjacent end of the casing 7 and form an air tight joint between the inflation and the casing. It will be observed that the shoulder 6 is devoid of any recesses or the like to accommodate the upper end of the casing 7 and does not require to be turned back over the casing in the usual manner, thus simplifying the construction and enabling the teat cup to be readily assembled and disassembled. The mouth piece 3 may be provided with an inwardly projecting circumferential lip 8 to grip the teat of a cow or like animal while, if desired, said lip may merge into a circumferential recess 9 (Figure 4) formed internally of the mouth piece. Said recess 9 increases the flexibility of the lip 8 and enables the teat cup to be readily applied to various sized teats.

Moulded or otherwise formed at or near the lower end of the inflation which may be inclined downwardly as at 11, is a plurality of longitudinally spaced abutments 12 adapted to adjustably engage the adjacent end of the casing 7 as hereinafter described. These abutments extend circumferentially on the exterior of the body of the inflation, which is preferably increased in thickness at this point as at 13 for reinforcing purposes.

The claw tube 14 may be formed integral with the inflation as illustrated in Figures 1, 4, 5, 6 and 8 of the drawing or, as seen in Figure 7, the claw tube may be formed separately and secured to the inflation by a suitable nipple fitting 16 passing through a hole 17 in the lower end of the inflation and provided at its inner end with a flange 16a to hold it in position.

The aforesaid abutments 12 are preferably formed by grooves or recesses which may be inclined in cross section as in Figure 1 somewhat in the form of ratchet or other teeth and in this instance the adjacent end of the casing 7 is preferably inclined inwardly as at 7a to facilitate engagement with said abutments. Or the lower end of the casing may be flared outwardly as at 7b in Figure 5, the grooves or recesses in this instance being substantially semicircular in cross section as at 12a in order to accommodate a separate stop ring 19 adapted to engage the flared end of the casing as shown. Figure 6 illustrates a further modification wherein the lower end of the casing is provided with a beaded edge 7c adapted to adjustably fit within the semicircular grooves 12a on the inflation.

In use, the inflation 2 is inserted into the casing 7 through the upper end thereof so that the claw tube 14 projects through the open lower end of the casing. By grasping the claw tube and pulling thereon while the casing is being held, the aforesaid shoulder 6 at the mouth piece end of the inflation is drawn hard up against the adjacent end of the casing and forms an air tight joint therewith. While the inflation is being pulled certain of the various abutments 12 successively slide past the adjacent end of the casing and when the claw tube is released one of these abutments automatically engages the peripheral edge of the casing, thus forming an air tight joint therewith and maintaining the inflation in the desired stretched condition.

It will be evident that the provision of a series of abutments 12, 12a as aforesaid on the lower end of the inflation 2 is not limited to inflations having integral mouth pieces as before mentioned, but that any suitable means may be employed for securing the upper end of the inflation to the casing. For example, Figures 8 to 16 of the accompanying drawing illustrate several known methods of connecting the upper end of the inflation to the casing and forming the necessary mouth piece. In Figure 8 the upper end portion of the inflation is provided with a groove 21 to receive the adjacent end of the casing, a portion 22 of the inflation being turned back over the casing as shown. The upper end of the casing may be provided with a beaded edge 23 as in Figure 9. Another form is shown in Figure 10 comprising an outstanding shoulder 20 on the inflation to engage the adjacent end of the casing 7 and a ring 25 to reinforce this end of the inflation and hold it in position. A removable cap 24 adapted to screw onto the casing as at 26 may be employed as in Figure 11 for holding the upper end of the inflation in position. Other means for securing the cap 24 in position include a bayonet joint 27 (Figure 12). An annular wedge 28 adapted to fit within the inflation (Figure 13) or a ring 29 co-operating with a shoulder 31 on the casing (Figure 14) may be employed to hold the upper end of the inflation in position. Figure 15 shows a spring ring 32 adapted to be sprung over the end of the inflation after it has been folded back over this end of the casing. Figure 16 illustrates another method of using a ring 29a of the kind seen in Figure 14.

Although the improved inflation has been illustrated as being circular in cross section it is to be understood that it is not limited to this shape but may be of triangular, polygonal or any other suitable shape in cross section. Furthermore, the inflation may taper longitudinally as in Figure 1 or its side walls may be parallel for portion of their length and merge into an inclined lower end as seen in Figure 4. Any other suitable shape may be adopted although it is preferred to reduce the diameter of the internal passage 2a through the inflation adjacent to the aforesaid abutment or abutments 12, thus providing a thickened wall 13 as aforesaid and strengthening the inflation at this point.

By forming one or more abutments on the body of the inflation as aforesaid an even tension throughout the inflation is ensured when the appropriate abutment is engaged with the adjacent end of the casing. Furthermore the improved inflation simplifies dismantling of the teat cup and facilitates cleansing operations and re-assembling.

A desirable feature of the present invention resides in the fact that when the upper end of the inflation is disconnected from the casing, the inflation may be withdrawn through the lower open end of the casing without disconnecting the teat cup from the milking machine.

Having now described my invention what I claim as new and desire to secure by Letters Patent is:—

1. An improved teat cup of the kind indicated comprising in combination an open ended casing and an inflation within said casing extending through both ends thereof, a claw tube carried by the lower end of the inflation, said inflation being provided at its lower end portion above the claw tube with a plurality of abutments adapted to normally engage the adjacent peripheral edge portion of the casing and maintain the inflation in a stretched condition, the opening in the lower end of the casing being large enough so that when the opposite end of the inflation is disconnected from the casing the inflation may be withdrawn through the open lower end of said casing without disconnecting the teat cup from the milking machine.

2. A teat cup of the character described, comprising a rigid tubular casing, an inflation adapted to be positioned in said casing, said inflation being formed of rubber or similar stretchable material, means at the teat receiving end of said inflation for detachably securing the same to the corresponding end of the casing, a claw tube at the other end of the inflation, the end of the inflation carrying the claw tube being adapted to pass through the corresponding end of the casing, a plurality of circumferential abutments formed on the exterior body of the inflation above the claw tube, and means carried by the claw tube end of the casing for circumferentially engaging the abutments on the inflation to retain the inflation in a stretched condition and to effect a tight joint between the casing and the inflation.

3. A teat cup of the character described, comprising a rigid tubular casing, an inflation adapted to be positioned in said casing, said inflation being formed of rubber or similar stretchable material, means at the teat receiving end of said inflation for detachably securing the same to the corresponding end of the casing, a claw tube at the other end of the inflation, the end of the inflation carrying the claw tube being adapted to pass through the corresponding end of the casing, a plurality of circumferential abutments formed on the exterior body of the inflation above the claw tube, and means carried by the claw tube end of the casing for circumferentially engaging the abutments on the inflation to retain the inflation in a stretched condition and to effect a tight joint between the casing and the inflation, each of said abutments being formed by a groove or recess extending circumferentially around the exterior of the body portion of the inflation, the side walls of the latter being of increased thickness adjacent said grooved or recessed portion.

4. A device according to claim 3 wherein each groove or recess is semicircular in cross section to accommodate a separate stop ring adapted to engage the adjacent end of the casing.

5. A teat cup of the character described, comprising a rigid tubular casing having open upper and lower ends, a flexible tubular inflation positioned in said casing and having a portion in spaced relation to the inner wall thereof, means for detachably securing the teat receiving end of the inflation to the upper end of the casing, the lower end of said inflation having an exterior diameter substantially equal to the interior diameter of the lower portion of said casing and extending through the lower open end of said casing, a plurality of circumferential abutments formed on the lower end of said inflation, means associated with the lower open end of the casing for circumferentially engaging the abutments on the inflation to retain the inflation in a stretched condition and to effect a tight joint between the casing and inflation, and a claw tube carried by the end of the inflation which extends through the open lower end of the casing.

JOHN HENRY DAVIS.